United States Patent
Lingafelt et al.

(10) Patent No.: US 7,039,954 B2
(45) Date of Patent: May 2, 2006

(54) METHOD FOR ENABLING A NETWORK-ADDRESSABLE DEVICE TO DETECT USE OF ITS IDENTITY BY A SPOOFER

(75) Inventors: Charles Steven Lingafelt, Durham, NC (US); Kevin Thomas McClain, Durham, NC (US); Carlos Fernando Villegas, Bullock, NC (US)

(73) Assignee: International Business Machines Corporation, Armonk, NY (US)

( * ) Notice: Subject to any disclaimer, the term of this patent is extended or adjusted under 35 U.S.C. 154(b) by 821 days.

(21) Appl. No.: 09/849,697

(22) Filed: May 4, 2001

(65) Prior Publication Data

US 2002/0166071 A1 Nov. 7, 2002

(51) Int. Cl.
- *G06F 11/30* (2006.01)
- *G06F 12/14* (2006.01)
- *H04L 9/00* (2006.01)
- *H04L 9/32* (2006.01)

(52) U.S. Cl. .......................................... 726/23; 726/14

(58) Field of Classification Search ................ 713/201, 713/200
See application file for complete search history.

(56) References Cited

U.S. PATENT DOCUMENTS

| 5,935,249 A * | 8/1999 | Stern et al. ................. 713/201 |
| 6,115,376 A * | 9/2000 | Sherer et al. ............... 370/389 |
| 6,697,943 B1 * | 2/2004 | Frantz ......................... 713/160 |
| 6,772,334 B1 * | 8/2004 | Glawitsch ................... 713/153 |

* cited by examiner

*Primary Examiner*—Gilberto Barron, Jr.
*Assistant Examiner*—G. Gurshman
(74) *Attorney, Agent, or Firm*—Schmeiser, Olsen & Watts; John R. Pivnichny

(57) ABSTRACT

A defense against spoofing vandals is provided, where the defense enlists the network-addressable device whose identity is used by the vandal. A network-addressable device checks incoming messages for communication protocol violations that indicate that a spoofer is using the identity of the network-addressable device. When such a protocol violation is detected, the network-addressable device records attributes of the incoming message in a spoofing logbook database. Further, the network-addressable device increments a counter associated with the identity of the spoofer's target. The value of the counter is compared with a predetermined threshold, in order to determine if the supposed spoofing is an isolated incident or part of a persistent attack. When the value of the counter exceeds the threshold, the network-addressable device constructs a spoofing alert, and sends the spoofing alert to a network administrator. The network-addressable device then rejects the message associated with the protocol violation.

21 Claims, 5 Drawing Sheets

| Source Addresses | Event Types | Event Times |
|---|---|---|
| ID1 | 1 or 2 | Time 1 |
| ID2 | 1 or 2 | Time 2 |
| ID3 | 1 or 2 | Time 3 |
| ⋮ | | |
| IDN | 1 or 2 | Time N |

320 — Source Addresses
330 — Event Types
340 — Event Times

310A — ID1 row
310B — ID2 row
310C — ID3 row
310N — IDN row

METHOD FOR ENABLING A NETWORK-ADDRESSABLE DEVICE TO DETECT USE OF ITS IDENTITY BY A SPOOFER

FIELD OF THE INVENTION

The present invention is related to the field of the Internet, and more particularly to a method for enabling a network-addressable device attached to the Internet to determine that its identity has been used by a spoofing vandal.

BACKGROUND

Internet-based activities are now subject to electronic vandalism. For example, a vandal or hacker may attack a target such as an Internet web server by flooding the target with a torrential flow of disruptive messages that overload the target to the point of functional failure. Attacks of this kind are called "denial of service" attacks. During a denial of service attack, the vandal may fraudulently assume a number of different electronic identities, often by including messages in the disruptive flow that have a variety of source addresses.

More specifically, a spoofing vandal or a spoofer is an attacker who uses a source address or other marking that fraudulently identifies the vandal as a source that the target already knows or that the target will normally accept at face value. Here, a network-addressable device whose identity is used by a vandal is called both a "spoofed device" and a "network-addressable device."

In one kind of denial-of-service attack, a spoofing vandal may send the target a large number of Internet Control Message Protocol (ICMP) messages called Packet INternet Gropers (PINGS), which are normally used to query whether a particular Internet address is accessible to the sender. Upon receiving a PING, the target sends a response message to the spoofed device rather than the vandal, as the PING bears the fraudulently used identity of the spoofed device. By flooding the target with PINGS, the vandal may divert the target's resources away from other tasks, and may also cause unproductive network congestion by triggering a flood of response messages.

In another kind of denial-of-service attack, the vandal may send the target a large number of TCP SYN messages. A TCP SYN message is normally used to initiate a TCP connection. Upon receiving a SYN message, the target sends a SYN/ACK message to the spoofed device rather than the vandal, as the SYN message bears the fraudulently used identity of the spoofed device. Further, the target reserves an internal data structure presumably to be used in supporting a connection with the spoofed device. So, by flooding the target with a large number of SYN messages, the vandal causes not only the problems mentioned above—resource diversion and network congestion—but also exhausts the target's capacity to support the data structures needed to establish other connections. Thus, the target is left unable to reliably establish connections with any device except the spoofed device.

To combat such attacks, a potential target may rely upon protective equipment that filters incoming messages. Such equipment detects the onslaught of a vandal's attack, reads the source addresses or other markings that the vandal usurps and fraudulently re-uses, and blocks all messages that seem to originate from this source.

Unfortunately, protective equipment of this kind addresses only part of the problem. The spoofed device remains unaware that its identity has been stolen, and the target is left with evidence that purports to show, albeit incorrectly, that the spoofed device—rather than the vandal—has attacked the target.

Thus there is a need for a defense against spoofing vandals, where the defense involves the spoofed device and not just the target, so that the spoofed device may become aware that its identity has been stolen, and so that the target does not conclude incorrectly that it has been attacked by the spoofed device.

SUMMARY OF THE INVENTION

The present invention provides a defense against spoofing vandals, where the defense involves the spoofed device rather than just the target. A network-addressable device checks incoming messages for communication protocol violations consequent to the incoming message that are indicative of the activity of a spoofing vandal who is using the identity of the network-addressable device to attack a target. Such violations may include the reception of an unsolicited response message, i.e., a response message for which there is no outstanding request message. For example, such a protocol violation may be the reception of an ICMP reply message when an ICMP PING has not been sent, or the reception of a SYN/ACK message when a SYN message has not been sent. When such a protocol violation is detected, the network-addressable device has good reason to believe that its identity has been stolen, and therefore assumes the role of a spoofed device. In a spoofing logbook database, the spoofed device records attributes of the incoming message that is associated with the protocol violation. Further, the spoofed device increments a counter associated with the identity of the target. The value of the counter is compared with a predetermined threshold, in order to assess whether the supposed spoofing is an isolated incident, perhaps caused by a transmission error, or if the supposed spoofing is part of an ongoing and persistent attack on the target. When the value of the counter is found to exceed the threshold, the spoofed device generates a spoofing alert, and sends the spoofing alert to a network administrator. In one embodiment of the invention, the spoofing alert is sent to the administrator who is responsible for the spoofed device. In another embodiment of the invention, the alert is sent to the administrator who is responsible for the target. In yet another embodiment of the invention, the alert is sent to both the administrator responsible for the spoofed device and the administrator responsible for the target. The spoofed device rejects the message associated with the protocol violation, thereby blocking the message from advancing any further into the spoofed device.

With the present invention, the spoofed device, which is also called here the network-addressable device, is made aware of the spoofing activity, so that it may take preventive measures, or so that it may bring its resources to bear against the spoofing vandal. Also, the target is made aware of the attack, as the target may lack its own protective equipment. These and other aspects of the present invention will be more fully appreciated when considered in light of the following detailed description and drawings.

BRIEF DESCRIPTION OF THE DRAWINGS

FIG. 3A shows an organization suitable for a spoofing logbook database.

DETAILED DESCRIPTION OF THE INVENTION

The present invention provides a way for a network-addressable device or spoofed device to determine that its identity is being used by a spoofing vandal, and to generate alerts warning network administrators that spoofing is underway or has taken place. Here, a spoofing alert may be a message that is conveyed electronically, or a message that is conveyed by humans using means such a telephone, a postal service, a courier, and so forth. Further, although the term "vandal" is used herein to characterize a spoofer, it should be noted that spoofing may occur accidentally without malicious intent, and that the term "spoofing vandal" as used herein includes accidental spoofers and other spoofers lacking malicious intent, as well as vandals and other deliberate spoofers with malicious intent, and that a spoofer's attack on a target may be either deliberate or accidental.

Figure 1:
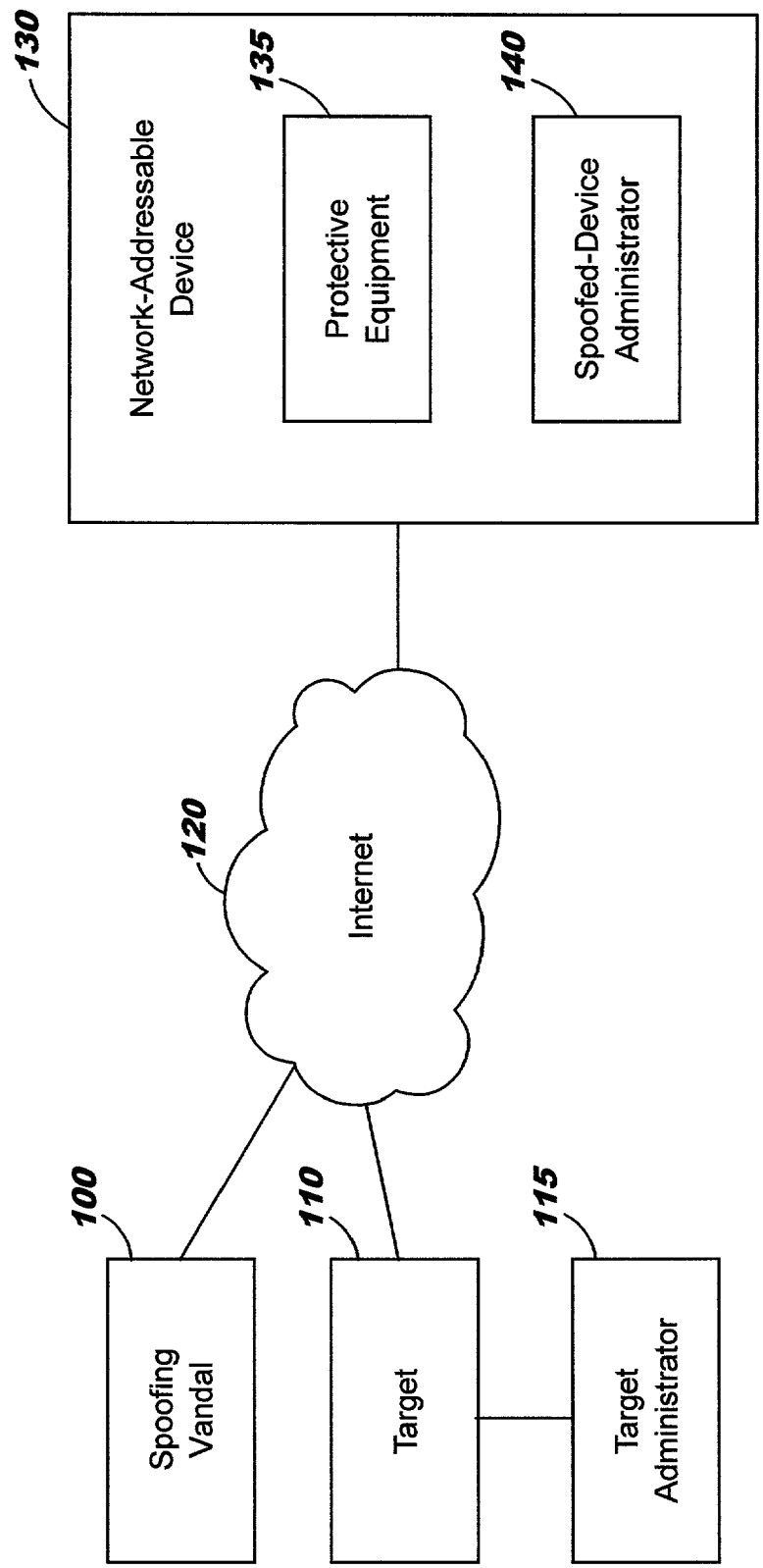
FIG. 1 shows a spoofing vandal, a target, and a spoofed device interconnected by the Internet.

FIG. 1 shows a spoofer or spoofing vandal 100, who sends disruptive messages, for example denial-of-service messages, to a target 110 through the Internet 120 or through another communication network. The target 110 falls under the management purview of a target administrator 115, which may be a human administrator or operator, or an automated network-management system.

The disruptive message or messages sent by the vandal 100 usurp and fraudulently use the identity of a spoofed device 130, which is also called here a network-addressable device. The spoofed device 130 may be connected to the vandal 100 or the target 110 by the Internet 120 or by another communication network. The spoofed device 130 includes protective equipment 135, either internal or external, and falls under the management purview of a spoofed-device administrator 140, which may be a human administrator or operator or may be an automated network-management system. The particular distribution of function shown in FIG. 1 is for purposes of illustration rather than limitation. In other embodiments of the invention, the protective equipment 135 and the spoofed-device administrator 140 may, for example, be external to the spoofed device 130.

Figure 2:
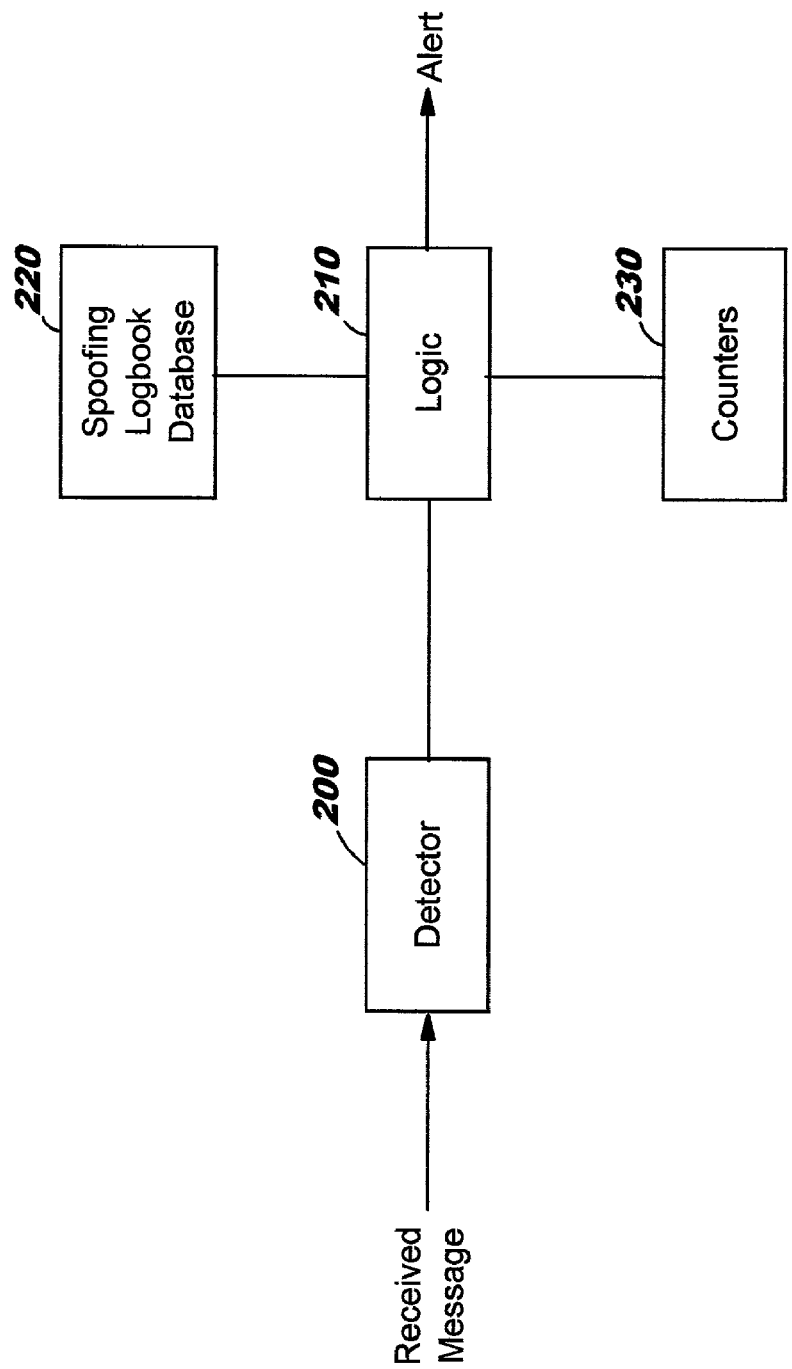
FIG. 2 is a block diagram that shows aspects of protective equipment of the spoofed device shown in FIG. 1.

FIG. 2 shows aspects of the protective equipment 135 of the spoofed device 130. A detector 200 receives incoming messages and checks these messages for protocol violations consequent to the message that are indicative of spoofing activity. Such protocol violations may include the reception by the spoofed device 130 of an unsolicited response message from the target, i.e., a response message from the target 110, for which there is no outstanding request message from the spoofed device 130. For example, such a protocol violation may be the reception by the spoofed device 130 of an ICMP reply when an ICMP PING has not been sent by the spoofed device 130, or the reception by the spoofed device 130 of a SYN/ACK message when a SYN has not been sent by the spoofed device 130.

The detector 200 may pass the incoming message and an indication of the presence or absence of spoofing activity to logic 210, which may be a programmable processor. In addition to accepting messages from the detector 200, the logic 210 also performs the following functions: managing a spoofing logbook database 220, which maintains records of attributes of incoming messages that are indicative of spoofing; managing a set of counters 230 that keep cumulative counts of incoming messages that are indicative of spoofing; comparing the counters' values to predetermined thresholds; and generating spoofing alerts that inform the target administrator 115 or the spoofed-device administrator 140 of the occurrence of spoofing. The particular distribution of function shown in FIG. 2 is for purposes of illustration rather than limitation. Other embodiments of the invention may rely on the logic 210 to implement the functions of the detector 200, or may combine the counters 230 and the spoofing logbook database 220 into a single structure, or may keep the counters 230 within the logic 210, and so forth.

FIG. 3A shows an exemplary structure of a spoofing logbook database 220. When the detector 200 determines that an incoming message is indicative of spoofing, the logic 210 enters a record into the spoofing logbook database 220. The exemplary spoofing logbook database 220 shown in FIG. 3A has a N records 310A through 310N, which correspond to N received messages indicative of spoofing. Each record 310A through 310N may include message attributes, for example the source address 320 of the message; an indication of the nature of the spoofing 330, for example event type 1 when an unsolicited response to a PING is received, or event type 2 when an unsolicited response to a SYN is received, and so forth; and the time at which the message is received (date, hour, minute, second) 340. The particular details of the spoofing logbook database 220, its records 310A through 310N, and its attributes 320, 330, and 340 are shown only for illustration, and are not to be construed as limitations of the present invention.

Figure 3B:
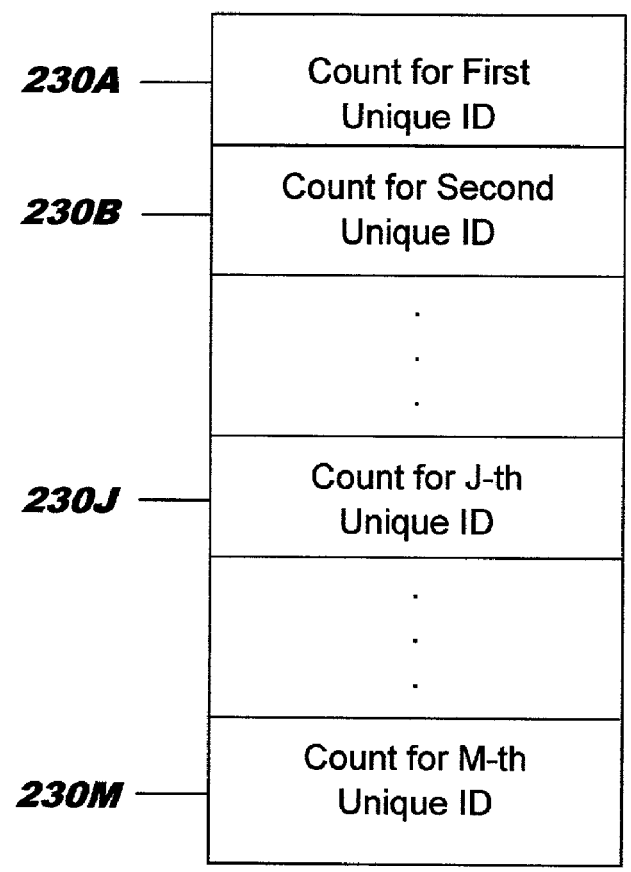
FIG. 3B shows a set of counters associated with the spoofing logbook database of FIG. 3A.

FIG. 3B shows M individual counters 230A through 230M of the set of counters 230 of the protective equipment 135. The individual counters 230A through 230M are associated with the records 310A through 310N of the spoofing logbook database 220. The purpose of the set of counters 230 is to keep accumulated totals of the occurrences of spoofing associated with each known target. In one embodiment of the invention, an individual counter is paired with each unique source ID 320 that appears in the spoofing logbook database 220. For example, the spoofing logbook database 220 might include fourteen records 310A through 310N, of which six are associated with the source ID of a first known target 110, five are associated with the source ID of a second known target (not shown), and three are associated with the source ID of a third known target (not shown). In this particular example, there would be three individual counters in the set of counters 230—a first counter 230A having the value six and associated with the first source ID, a second counter 230B having the value five and associated with the second source ID, and a third counter 230C having the value three and associated with the third source ID. Every time that the detector 200 detects a message that is indicative of spoofing of the first source ID, the first counter 230A is increased; likewise for the second counter 230B and the third counter 230C, when messages are detected that are indicative of spoofing of the second source ID and the third source ID, respectively. It should be noted that the exemplary structure shown in FIG. 3B and described above is for purposes of illustration rather than limitation, and the counters 230A through 230M may be kept and arranged in other ways as well.

Figure 4:
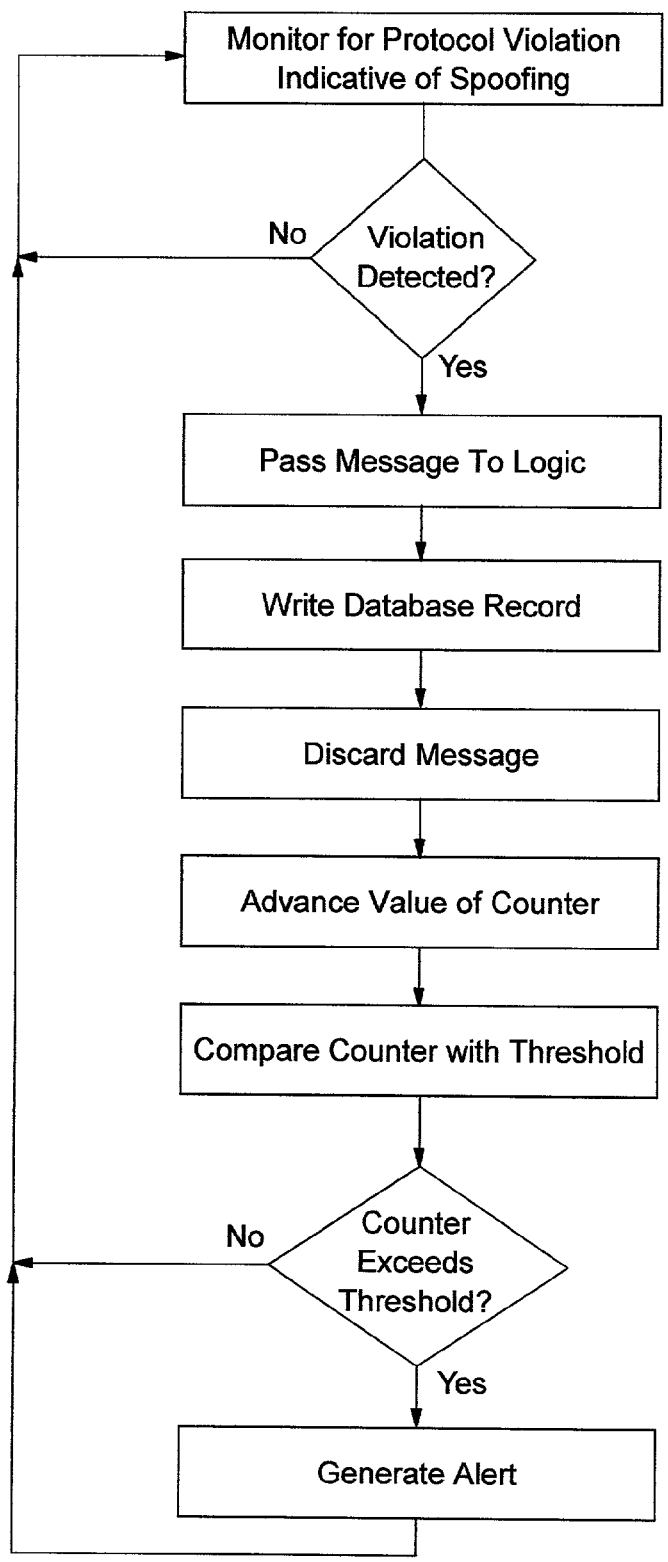
FIG. 4 is a flowchart that shows aspects of the operation of the protective equipment of FIG. 2.

FIG. 4 shows aspects of the operation of the protective equipment 135. As described above, the detector 200 monitors incoming messages for communication protocol violations that are indicative of spoofing activity (step 400). In the absence of a protocol violation indicative of spoofing activity, the detector 200 continues to monitor.

When the detector 200 detects a communication protocol violation that is indicative of spoofing activity, the detector 200 passes the indicative message to the logic 210 along with an indication of suspected spoofing (step 410). The logic 210 creates a spoofing logbook database 220 record, for example the N-th record 310N of FIG. 3A (step 420). The newly created record 310N may include attributes of the indicative message such as source ID 320, event type 330, and time of arrival 340, as mentioned above. The logic 210 then discards the message (step 430), thereby blocking the message from going any further into or towards the spoofed device 130.

The logic 210 increments the individual counter 230J of the set of counters 230 that is associated with the source ID 320 of the database record just entered 310N (step 440). The logic 210 then compares the value of the individual counter 230J just incremented with a predetermined threshold, in order to determine if the message associated with the protocol violation is an isolated incident or if it is part of a persistent pattern of attack (step 450). When the value of the individual counter 230J does not exceed the threshold, the protective equipment 135 returns to monitor for protocol violations (step 400).

Otherwise (i.e., the value of the individual counter 230J exceeds the threshold), the logic 210 generates a spoofing alert to inform the spoofed device administrator 140 and the target administrator 115 (step 450). The protective equipment 135 then returns to monitor for protocol violations that are indicative of spoofing (step 400).

From the foregoing description, those skilled in the art will recognize that the present invention improves the performance of protective equipment that guards against spoofing, by engaging the services of the spoofed device and by using information that is available to the spoofed device but unavailable to the target. The foregoing description is illustrative rather than limiting, however, and the present invention is limited only by the following claims.

We claim:

1. A method enabling a network-addressable device to detect use of its identity by a spoofing vandal, comprising the acts of:
   receiving a message by the network-addressable device from a target of a denial of service attack by the spoofing vandal, said attack comprising a denial of service communication sent by the spoofing vandal to the target;
   detecting, by the network-addressable device, a communication protocol violation consequent to the message, wherein the communication protocol violation is indicative of the denial of service attack on the target by the spoofing vandal using an identity of the network-addressable device in the denial of service communication, said detecting being performed after said receiving has been performed; and
   generating, by the network-addressable device, a spoofing alert responsive to the act of detecting the communication protocol violation.

2. The method of claim 1, wherein the network-addressable device is connected to the target by a communication network, said method further comprising:
   sending the spoofing alert to at least one network administrator selected from the group consisting of a first network administrator who is responsible for the network-addressable device, a second network administrator who is responsible for the target, and both the first network administrator and the second network administrator.

3. The method of claim 1, wherein the protocol violation includes reception by the network-addressable device of an unsolicited response message sent by the target.

4. The method of claim 1, wherein the protocol violation includes the reception by the network-addressable device of an ICMP reply sent by the target when an ICMP PING has not been sent to the target by the network-addressable device.

5. The method of claim 1, wherein the protocol violation includes reception by the network-addressable device of a SYN/ACK message when a SYN message has not been sent to the target by the network-addressable device.

6. A method enabling a network-addressable device to detect use of its identity by a spoofer, comprising the acts of:
   receiving a message by the network-addressable device;
   detecting a communication protocol violation consequent to the message, wherein the communication protocol violation is indicative of activity of a spoofing vandal using the identity of the network-addressable device in an attack on a target;
   recording attributes of the message;
   advancing the value of a counter associated with the target;
   comparing the value of the counter with a predetermined threshold; and
   generating a spoofing alert when the value of the counter exceeds the threshold.

7. The method of claim 6, wherein the network-addressable device is connceted to the target by a communication network.

8. The method of claim 7, further comprising providing a first network administrator who is responsible for the network-addressable device and a second network administrator who is responsible for the target.

9. The method of claim 8, wherein the first network administrator is a first automated network management system, and wherein the second network administrator is a second automated network management system.

10. The method of claim 7, wherein the network-addressable device is connected to the spoofing vandal by the communication network.

11. The method of claim 7, wherein said detecting, recording, advancing, comparing, and generating are performed by the network-addressable device.

12. The method of claim 6, wherein the protocol violation includes reception by the network-addressable device of an unsolicited response message sent by the target.

13. The method of claim 6, wherein the protocol violation includes the reception by the network-addressable device of an ICMP reply sent by the target when an ICMP PING has not been sent to the target by the network-addressable device.

14. The method of claim 6, wherein the protocol violation includes reception by the network-addressable device of a SYN/ACK message when a SYN message has not been sent to the target by the network-addressable device.

15. The method of claim 6, wherein the protocol violation includes reception by the network-adressable device of an unsolicited response message sent by the target.

16. The method of claim 6, wherein the protocol violation includes the reception by the network-addressable device of an ICMP reply sent by the target when an ICMP PING has not been sent to the target by the network-addressable device.

17. The method of claim 6, wherein the protocol violation includes reception by the network-addressable device of a SYN/ACK message when a SYN message has not been sent to the target by the network-addressable device.

18. A method enabling a network-addressable device to detect use of its identity by a spoofing vandal, comprising the acts of:
receiving a message by the network-addressable device from a target of a denial of service attack by the spoofing vandal, said attack comprising a denial of service communication sent by the spoofing vandal to the target;
detecting, by the network-addressnble device, a communication protocol violation consequent to the message, wherein the communication protocol violation is indicative of the denial of service attack on the target by the spoofing vandal using the identity of the network-addressable device in the denial of service communication, said detecting being performed after said receiving has been perfomed;
recording attributes of the message;
advancing the value of a counter associated with the target;
comparing the value of the counter with a predetermined threshold;
generating a spoofing alert when a result of said comparing is that the value of the counter exceeds the threshold, said recording, advancing, comparing, and generating being performed by the network-addressable device.

19. The method of claim 18, wherein said recording comprises recording said attributes of the message in a spoofing logbook database.

20. The method of claim 19, wherein said recorded attributes of the message in the spoofing logbook database comprise a source address of the message, an indication of a nature of the activity of the spoofing vandal, and a time at which the message has been received.

21. The method of claim 18, wherein the network-addressable device is connected to the target by a communication network, said method further comprising:
sending the spoofing alert to at least one network administrator selected from the group consisting of a first network administrator who is responsible for the network-addressable device, a second network administrator who is responsible for the target, add both the first network administrator and the second network administrator.

* * * * *

UNITED STATES PATENT AND TRADEMARK OFFICE
CERTIFICATE OF CORRECTION

| | | |
|---|---|---|
| PATENT NO. | : 7,039,954 B2 | Page 1 of 1 |
| APPLICATION NO. | : 09/849697 | |
| DATED | : May 2, 2006 | |
| INVENTOR(S) | : Lingafelt et al. | |

It is certified that error appears in the above-identified patent and that said Letters Patent is hereby corrected as shown below:

<u>Column 5</u>
Lines 56-57, delete "said detecting being performed after said receiving has been performed; and" and insert -- the detecting of the communication protocol violation, being performed after the receiving of the message by the network-addressable device has been performed; and --

<u>Column 7</u>
Lines 19-20, delete "said detecting being performed after said receiving has been performed;" and insert -- the detecting of the communication protocol violation being performed after the receiving of the message has been performed; --

Signed and Sealed this

Twenty-second Day of August, 2006

JON W. DUDAS
*Director of the United States Patent and Trademark Office*